(12) United States Patent
Liverman et al.

(10) Patent No.: US 7,765,852 B2
(45) Date of Patent: Aug. 3, 2010

(54) AIR FLOW NOZZLE FOR AIR FLOW METER

(75) Inventors: Ivan Neil Liverman, Middlesex, NC (US); Mark Edmund Maresh, Tucson, AZ (US); Christopher John Sattora, Cary, NC (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 11/282,915

(22) Filed: Nov. 18, 2005

(65) Prior Publication Data

US 2007/0114692 A1    May 24, 2007

(51) Int. Cl.
*G01N 15/08* (2006.01)
(52) U.S. Cl. .......................................................... 73/38
(58) Field of Classification Search ..................... 73/38; 239/74; 417/63
See application file for complete search history.

(56) References Cited

U.S. PATENT DOCUMENTS

| 3,790,084 A | 2/1974 | Kinsley ....................... 239/291 |
| 5,556,258 A * | 9/1996 | Lange et al. ................... 417/63 |
| 2003/0009132 A1 * | 1/2003 | Schwartz et al. ............ 604/152 |

FOREIGN PATENT DOCUMENTS

EP           0146514 A2 *   11/1984
JP           06-106005        4/1994

* cited by examiner

*Primary Examiner*—Hezron Williams
*Assistant Examiner*—Mark Shabman
(74) *Attorney, Agent, or Firm*—Yee & Associates, P.C.; Steven L. Bennett

(57) ABSTRACT

The aspects of the present invention provide for an apparatus for conveying air into foam so that the flow of air within the foam may be monitored to determine one or more characteristics of the foam. The apparatus includes a nozzle and a member having a substantially planar surface. The nozzle includes a tube sized and dimensioned to be inserted easily into the foam. The tube has a wall and an aperture formed in the wall. The aperture is sized and dimensioned to allow air to flow through the aperture and into the foam, and the aperture extends partially about the circumference of the tube. The member is mounted to the nozzle and is also connected to an air flow meter.

4 Claims, 2 Drawing Sheets

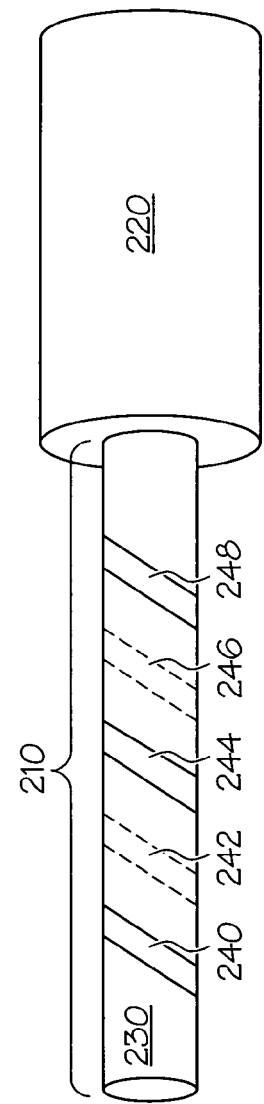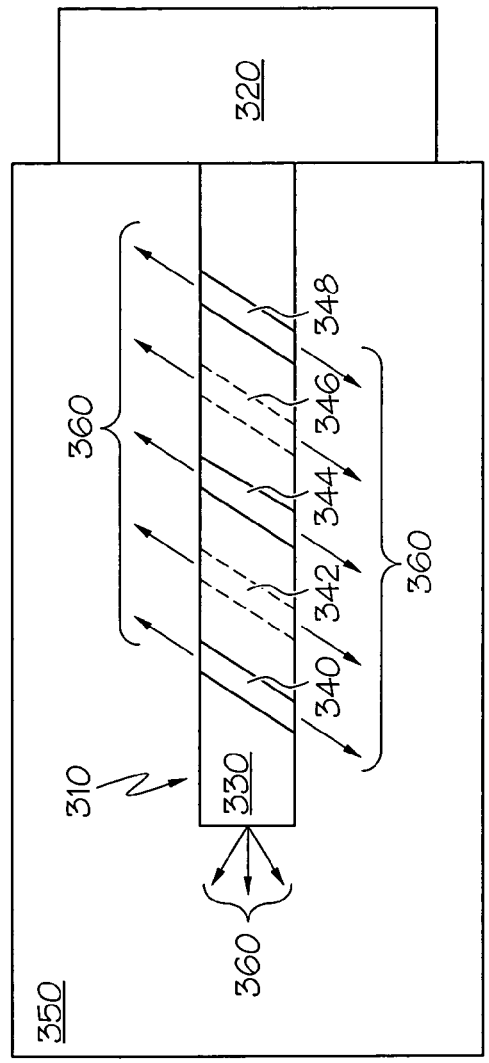

AIR FLOW NOZZLE FOR AIR FLOW METER

BACKGROUND OF THE INVENTION

1. Field of the Invention

The aspects of the present invention relate generally to the field of molded foams.

2. Description of the Related Art

Molded foam is one of the most common forms of packaging material used for the shipment of fragile items. Some examples of molded foams are expandable polystyrene (EPS), expandable polypropylene (EPP), and expandable polyethylene (EPE).

Molded foam is initially supplied to molders as a resin in the form of beads. The beads are loaded into a mold along with a blowing agent, such as pentane or carbon dioxide, which allow the beads to expand upon processing. Steam pressure is used to expand the beads into a shape determined by the mold and then force the beads to fuse together after expansion. The fused beads are then cooled to form a molded, closed-cell foam part.

The cushioning characteristic of the foam is based on the shape of the foam, the bead size, the bead processing conditions, and the quality of the bead fusion. Variations in these characteristics may cause the foam to fail acceptable quality standards, because foam that falls outside acceptable quality standards may not, for example, adequately protect products from damage when the foam is placed around these products.

The quality of the bead fusion strongly influences the strength characteristics of the foam. The degree of fusion or how much the beads have bonded during the molding process determines the quality of the bead fusion.

Currently, the most common method for determining bead fusion quality is a visual inspection. In order to inspect the core or middle of the molded foam piece, an inspector must break apart or cut the molded foam piece to visually inspect the bead fusion quality. As a result, the foam is rendered unusable. Currently, no known solutions exist to reliably and repeatedly test the quality of fused beads in a foam without destroying the foam.

Therefore, it would be advantageous to have a reliable, repeatable, and non-destructive method for testing the bead fusion quality in molded foams.

BRIEF SUMMARY OF THE INVENTION

The aspects of the present invention provides an apparatus for conveying air into foam so that the flow of air within the foam may be monitored to determine one or more characteristics of the foam. The apparatus includes a nozzle and a member having a substantially planar surface. The nozzle includes a tube sized and dimensioned to be inserted easily into the foam. The tube has a wall and an aperture formed in the wall. The aperture is sized and dimensioned to allow air to flow through the aperture and into the foam, and the aperture extends partially about the circumference of the tube. The member is mounted to the nozzle and is also connected to an air flow meter.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 shows an apparatus for conveying air into foam, in accordance with an illustrative embodiment of the present invention; and FIG. 3 depicts a test scenario in which an illustrative embodiment of the present invention may be implemented.

DETAILED DESCRIPTION OF THE INVENTION

Figure 1:
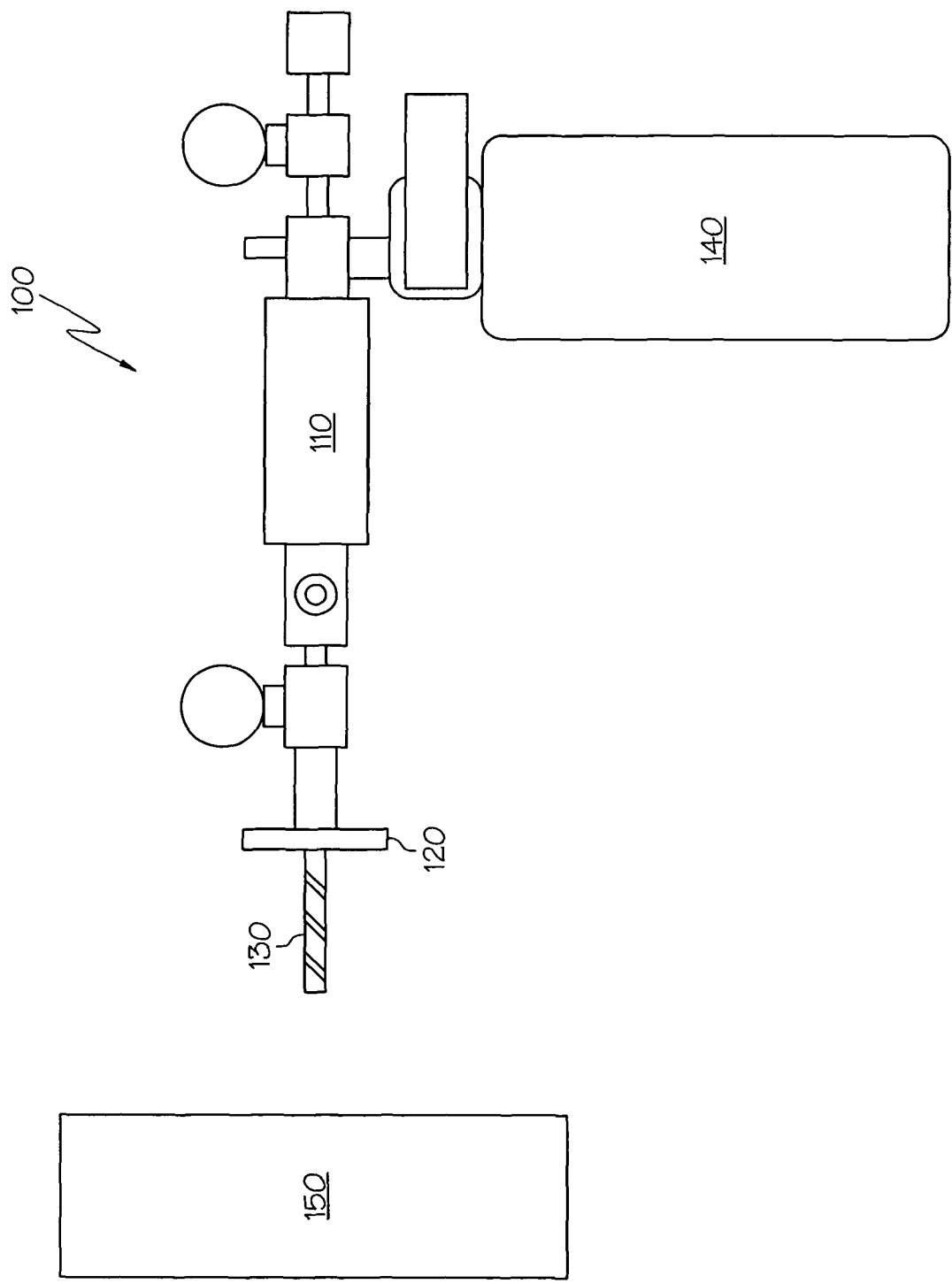
FIG. 1 shows a device for measuring the flow of air in foam, in accordance with an illustrative embodiment of the present invention.

FIG. 1 shows a device for measuring the flow of air in foam, in accordance with an illustrative embodiment of the present invention. Device 100 includes air flow meter 110, nozzle 130, and member having a substantially planar surface 120. Nozzle 130 and member 120 are operatively connected to air flow meter 110, and member 120 is operatively connected to nozzle 130. The term "operatively connected" means that components that are operatively connected to each other are connected and are in an operative or working condition in relation to each other. Components are connected if they are directly or indirectly connected to each other. Components are directly connected if each component is directly touching the other. First and second components are indirectly connected if other components are also connected to the first and second components, though the first and second components do not directly connect. In this case, nozzle 130 is directly and operatively connected to member 120. Member 120 is directly and operatively connected to air flow meter 110. Therefore, nozzle 130 is indirectly and operatively connected to air flow meter 110.

To test foam 150 for bead fusion quality, the tip of nozzle 130 is inserted into foam 150. Nozzle 130 is inserted into the foam until the side of member 120 abuts the external surface of foam 150. Member 120 is adapted to form a substantially air tight seal with the external surface of foam 150. Thus, member 120 is proximate to the point of insertion of nozzle 130.

An air source 140 supplies air to the device 100 and flows through air flow meter 110, member 120, and nozzle 130 into foam 150. Air meter 110 determines the rate of air flowing through device 100 into foam 150. The rate of air flowing in foam 150 may be used to provide a measure of the bead fusion quality of foam 150 and thus can also be used to indicate the strength characteristic of foam 150.

FIG. 2 is an apparatus for conveying air into foam, in accordance with an illustrative embodiment of the present invention. Apparatus 200 includes nozzle 210 and member with a substantially planar surface 220. Nozzle 210 includes tube 230 and apertures 240, 242, 244, 246, and 248. Tube 230 includes a rigid material, such as stainless steel, aluminum, acrylonitrile butadiene styrene (ABS), or any other metal alloy or resin based material. Tube 230 is sized and dimensioned so as to be inserted easily into the foam. In other words, tube 230 is thin and long enough to be inserted into the foam without causing unacceptable damage to the foam. The size and dimension of tube 230 will vary depending on the implementation. For example, the length of the tube will vary depending on the thickness of the foam being tested, because the length should be approximately half the thickness of the foam. In the present embodiment, tube 230 is between 0.25 mm to 5 mm in diameter and 1 cm to 20 cm in length.

At the same time, tube 230 is made from a material able to maintain a rigid shape upon insertion. Tube 230 may have a pointed tip. Additionally, the cross section of tube 230 can be any number of shapes, including but not limited to a right circular cylinder, a right elliptical cylinder, or a triangular cylinder. Furthermore, tube 230 can have the same diameter or a gradually increasing or decreasing diameter distally or proximally relative to the air flow meter to which the tube is attached. In the illustrative embodiment, tube 230 is a right circular cylinder and has the same diameter throughout the length of tube 230.

Tube 230 can have one or more apertures. In the illustrative embodiment, tube 230 has a wall with apertures 240, 244, and 248 formed in one side of the wall and apertures 242 and 246 in the other side of the wall. In the illustrative embodiment shown, apertures 240, 242, 244, 246, and 248 are not aligned behind each other. In addition, each aperture 240, 242, 244, 246, and 248 only partially extends about the circumference of the tube 230 in these illustrative embodiments. Additionally, apertures 240, 242, 244, 246, and 248 are distributed along the length of tube 230 so as to ensure the adequate distribution of air throughout the foam. Apertures 240, 242, 244, 246, and 248 can have the following shapes: circular, rectangular, a parallelogram, or any other shape. In the illustrative embodiment, apertures 240, 242, 244, 246, and 248 are parallelograms and evenly distributed along the length of tube 230.

Member 220 is operatively connected to nozzle 210 and to an air flow meter, such as air flow meter 110 described in FIG. 1. Member 220 has a substantially planar surface or a surface with a two-dimensional characteristic. Member 220 can be any number of shapes including, but not limited to a right circular cylinder, a right elliptical cylinder, or a triangular cylinder.

Member 220 is adapted to form a substantially air tight seal with an external surface of the foam piece, proximate to a point of insertion of nozzle 200. The air tight seal prevents the air from flowing outside the foam, thereby increasing the accuracy of the air flow reading within the foam. In the illustrative embodiment, member 220 is approximately one inch in diameter and member 220 is made of a compliant material. A compliant material is any material that is pliable or capable of being shaped or slightly compressed under normal intended use for that material. Compliant materials may return to their original shape when not compressed or bent. In this case, a compliant material may be a soft rubber, soft plastic, or some other material capable of making an air-tight seal against a material with the approximate hardness of the foam being tested. However, member 220 can also be made from a rigid material or a combination of a rigid and compliant material. A rigid material may be a metal alloy, a plastic resin, or any combination thereof.

FIG. 3 depicts a test scenario in which an illustrative embodiment of the present invention may be implemented. In use, nozzle 310, including tube 330 and apertures 340, 342, 344, 346, and 348, is inserted into foam 350. Member 320 abuts the external surface of foam 350 and is adapted to form a substantially air tight seal with the external surface of foam 350. The substantially air tight seal prevents the air from flowing outside the foam, thereby increasing the accuracy of the air flow reading within foam 350.

Apertures 340, 342, 344, 346, and 348 allow for the adequate distribution of air through foam 350. Apertures 340, 342, 344, 346, and 348 allow for better air flow 360 readings in case a particular bead within foam 350 blocks the air passage of one of apertures 340, 342, 344, 346, or 348. In other words, an air flow meter will read a lower rate of air flow if an aperture is blocked. For example, if nozzle 330 only had one aperture, and that aperture was blocked by a bead, then the air flow meter would record a lower air flow rate 360 than what might actually be present in foam 350. Multiple apertures reduce the chance that all air flow from the nozzle will be blocked by individual beads.

In use, a method of measuring the bead fusion quality of foam 350 includes the step of inserting nozzle 310 into a point of insertion in foam 350. At that point, member 320 forms a substantially air tight seal with an external surface of foam 350. Air is routed from an air source and is disbursed throughout apertures 340, 342, 344, 346, and 348. Airflows 360 move around the fused beads and an air flow measurement is obtained. The bead fusion quality determines how well the beads fused or bonded during molding and is calculated based on the air flow reading.

The aspects of the present invention provide an apparatus for determining one or more characteristics of the foam by conveying air into foam. The flow of air within the foam is monitored. The density and the strength characteristics of the foam are determined using the flow of air within the foam.

The apparatus includes a nozzle and a member having a substantially planar surface. The nozzle and member are operatively connected together. The member is also directly connected to an air flow meter. The nozzle includes a tube which is sized and dimensioned to be inserted easily into the foam. The tube has a wall and one or more apertures formed in the wall. The apertures are sized and dimensioned to allow air to flow through the apertures and into the foam. In an illustrative embodiment, the apertures extend partially about the circumference of the tube. The member is made from a compliant material in order for the member to form a substantially air tight seal with the external surface of the foam. In the manner presented, the aspects of the present invention provide an apparatus for conveying air into foam, a device for measuring the flow of air in foam, and a method for measuring the bead fusion quality of the foam.

The aspects of the present invention allow for a reliable, repeatable, and non-destructive method for determining the fusion quality of foam. The method does not require an inspector to break apart or cut the foam to visually inspect the bead fusion quality. A visual inspection is subjective and does not produce a quantitative, objective measurement. Consequently, a visual inspection may produce greater variability in quality results than a quantitative measurement. The aspects of the present invention give an objective measurement which can be tested repeatedly to verify the bead fusion quality results. Furthermore, since the foam is not destroyed in the testing process, the same foam can be repeatedly tested at different locations within the same test sample to further increase the reliability of the test results. In addition, the aspects of the present invention allow the foam to be used as intended to protect fragile items in shipment and not rendered unusable as would have been in a visual inspection.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of conducting a non-destructive test on fused beads in a molded foam to measure a bead fusion quality of the fused beads, the method comprising:
   inserting a nozzle, directly and operatively connected to a member, into the molded foam to an insertion depth of the molded foam, the member having substantial planar surface, wherein the nozzle comprises:
   a tube having a wall;
   a plurality of apertures formed in the wall of the tube and distributed along the length of the tube, wherein an aperture in the plurality of apertures extends partially about a circumference of the tube;
   forming, by the member abutting the external surface of the molded foam when inserted, an air tight seal with the external surface of the molded foam, proximate to the point of insertion of the nozzle;
   supplying air from an air source that flows through an air flow meter, the member, and the nozzle into the molded foam;
   disbursing the air through the plurality of apertures, thereby causing the air to flow around the fused beads; and
   monitoring the air flow around the fused beads to obtain a monitored air flow.

2. The method of claim 1, wherein the nozzle further comprises the apertures having the shape of a parallelogram.

3. The method of claim 1, wherein the nozzle has a pointed tip.

4. The method of claim 1, wherein the insertion depth is half a thickness of the molded foam.

* * * * *